United States Patent
Shields et al.

(10) Patent No.: US 11,474,537 B2
(45) Date of Patent: Oct. 18, 2022

(54) SAFETY SYSTEM FOR AN AUTOMATED STORAGE AND PICKING SYSTEM AND METHOD OF OPERATION THEREOF

(71) Applicant: OCADO INNOVATION LIMITED, Hatfield (GB)

(72) Inventors: Jennifer Jane Shields, Hatfield (GB); Timothy Deighton Steiner, Hatfield (GB); Nicholas John Butler, Hatfield (GB); Pete Campbell, Hatfield (GB)

(73) Assignee: OCADO INNOVATION LIMITED, Hatfield (GB)

( * ) Notice: Subject to any disclaimer, the term of this patent is extended or adjusted under 35 U.S.C. 154(b) by 154 days.

(21) Appl. No.: 16/482,555

(22) PCT Filed: Feb. 1, 2018

(86) PCT No.: PCT/EP2018/052578
§ 371 (c)(1),
(2) Date: Jul. 31, 2019

(87) PCT Pub. No.: WO2018/141876
PCT Pub. Date: Aug. 9, 2018

(65) Prior Publication Data
US 2020/0002091 A1 Jan. 2, 2020

(30) Foreign Application Priority Data
Feb. 1, 2017 (GB) ...................... 1701615

(51) Int. Cl.
*G05D 1/02* (2020.01)
*B65G 1/04* (2006.01)
(Continued)

(52) U.S. Cl.
CPC .............. *G05D 1/0291* (2013.01); *B60L 3/04* (2013.01); *B65G 1/0464* (2013.01);
(Continued)

(58) Field of Classification Search
CPC .. G05D 1/0291; G05D 1/0297; G05D 1/0027; G05D 1/0276; B60L 3/04;
(Continued)

(56) References Cited

U.S. PATENT DOCUMENTS 4,568,233 A 2/1986 Baker et al.
5,897,595 A * 4/1999 Hawkins ............... G05D 1/0297
701/50

(Continued)

FOREIGN PATENT DOCUMENTS

CN 102612476 A 7/2012
CN 104080717 A 10/2014
(Continued)

OTHER PUBLICATIONS

Office Action (Notification of Reason for Refusal) dated Jun. 23, 2021, by the Korean Patent Office in corresponding Korean Patent Application No. 10-2019-7023152, and an English Translation of the Office Action. (15 pages).
(Continued)

*Primary Examiner* — Thomas Randazzo
(74) *Attorney, Agent, or Firm* — Buchanan Ingersoll & Rooney PC

(57) ABSTRACT

A safety system for an automated storage and picking system is described. The storage system includes load handling devices operating above a series of stacked containers located within a framework, the top of which includes tracks on which the load handling devices operate. The safety system includes a transmitter located in close proximity to the storage system and a receiver located on each of the load handling devices. The transmitter can continually transmit a signal that is detected by the receivers on the load handling devices. In the event of an emergency or a breach of the storage system, the transmission of the signal is cut. Once
(Continued)

the receiver no longer receives the signal from the transmitter, power to each load handling device drive is cut to render the storage system safe.

16 Claims, 6 Drawing Sheets

(51) Int. Cl.
 *B65G 1/06* (2006.01)
 *G05B 19/418* (2006.01)
 *G05B 19/406* (2006.01)
 *B60L 3/04* (2006.01)
 *B66F 9/06* (2006.01)
 *G05B 19/409* (2006.01)
 *G05D 1/00* (2006.01)
(52) U.S. Cl.
 CPC ........... *B65G 1/0478* (2013.01); *B65G 1/065* (2013.01); *B66F 9/063* (2013.01); *G05B 19/406* (2013.01); *G05B 19/409* (2013.01); *G05B 19/41895* (2013.01); *G05D 1/0027* (2013.01); *G05D 1/0276* (2013.01); *G05D 1/0287* (2013.01); *G05D 1/0297* (2013.01); *G05D 2201/0216* (2013.01)
(58) Field of Classification Search
 CPC .... B65G 1/0464; B65G 1/0478; B65G 1/065; G05B 19/406; G05B 19/409; G05B 19/41895
 See application file for complete search history.

(56) References Cited

U.S. PATENT DOCUMENTS

| | | | |
|---|---|---|---|
| 7,912,574 | B2 | 3/2011 | Wurman et al. |
| 8,606,392 | B2 | 12/2013 | Wurman et al. |
| 9,334,114 | B2 | 5/2016 | Salichs et al. |
| 9,422,108 | B2* | 8/2016 | Hognaland ............... B66F 9/06 |
| 9,519,284 | B2 | 12/2016 | Wurman et al. |
| 9,607,285 | B1* | 3/2017 | Wellman ............. G05D 1/0027 |
| 9,617,082 | B2 | 4/2017 | Baker |
| 9,643,780 | B2 | 5/2017 | Salichs et al. |
| 9,643,781 | B2 | 5/2017 | Salichs et al. |
| 9,796,080 | B2 | 10/2017 | Ingram-Tedd et al. |
| 9,850,066 | B2 | 12/2017 | Salichs et al. |
| 10,067,501 | B2 | 9/2018 | Wurman et al. |
| 10,133,267 | B2 | 11/2018 | Wurman et al. |
| 10,526,143 | B2 | 1/2020 | Salichs et al. |
| 10,556,742 | B2 | 2/2020 | Lindbo et al. |
| 10,809,706 | B2 | 10/2020 | Wurman et al. |
| 10,913,601 | B2 | 2/2021 | Suzuki |
| 10,974,898 | B2 | 4/2021 | Salichs et al. |
| 10,990,088 | B2 | 4/2021 | Wurman et al. |
| 2002/0007235 | A1* | 1/2002 | Hwang ..................... B60L 3/04 701/70 |
| 2002/0165648 | A1 | 11/2002 | Zeitler |
| 2006/0287769 | A1* | 12/2006 | Yanagita ................ B25J 9/1682 700/245 |
| 2007/0293978 | A1 | 12/2007 | Wurman et al. |
| 2011/0005846 | A1* | 1/2011 | Page ........................ B25J 5/005 180/68.5 |
| 2011/0060449 | A1 | 3/2011 | Wurman et al. |
| 2012/0219397 | A1 | 8/2012 | Baker |
| 2013/0129453 | A1 | 5/2013 | Salichs et al. |
| 2013/0129454 | A1 | 5/2013 | Salichs et al. |
| 2013/0129456 | A1 | 5/2013 | Salichs et al. |
| 2013/0129469 | A1 | 5/2013 | Salichs et al. |
| 2014/0100690 | A1 | 4/2014 | Wurman et al. |
| 2015/0032252 | A1 | 1/2015 | Galluzzo et al. |
| 2015/0307276 | A1 | 10/2015 | Hognaland |
| 2016/0031077 | A1* | 2/2016 | Inaba ..................... B25J 9/1674 901/3 |
| 2016/0129587 | A1* | 5/2016 | Lindbo ................ B65G 1/0464 700/218 |
| 2016/0288687 | A1* | 10/2016 | Scherle ................... B60L 5/005 |
| 2016/0304278 | A1 | 10/2016 | Hognaland |
| 2017/0038770 | A1 | 2/2017 | Wurman et al. |
| 2017/0108860 | A1* | 4/2017 | Doane ...................... G08G 1/16 |
| 2017/0129706 | A1 | 5/2017 | Hognaland |
| 2017/0192427 | A1* | 7/2017 | Bivans ..................... E02F 9/205 |
| 2017/0223712 | A1 | 8/2017 | Stephens et al. |
| 2017/0291803 | A1 | 10/2017 | Hognaland |
| 2017/0341236 | A1* | 11/2017 | Patrick .................. B25J 13/081 |
| 2018/0043528 | A1 | 2/2018 | Lindbo et al. |
| 2018/0053141 | A1* | 2/2018 | Shydo, Jr. ............. G06Q 10/087 |
| 2018/0072546 | A1 | 3/2018 | Hognaland |
| 2018/0141751 | A1* | 5/2018 | Muranaka ............ G05D 1/0016 |
| 2018/0170672 | A1 | 6/2018 | Salichs et al. |
| 2018/0196413 | A1 | 7/2018 | Wurman et al. |
| 2018/0354893 | A1 | 12/2018 | Wurman et al. |
| 2019/0002255 | A1 | 1/2019 | Hognaland |
| 2019/0047786 | A1 | 2/2019 | Suzuki |
| 2019/0064785 | A1 | 2/2019 | Wurman et al. |
| 2020/0031640 | A1 | 1/2020 | Hognaland |
| 2020/0148474 | A1 | 5/2020 | Salichs et al. |
| 2020/0223629 | A1 | 7/2020 | Lindbo et al. |
| 2020/0262649 | A1 | 8/2020 | Hognaland |
| 2020/0346348 | A1* | 11/2020 | Zhu ........................ B25J 9/0084 |
| 2021/0198039 | A1 | 7/2021 | Salichs et al. |

FOREIGN PATENT DOCUMENTS

| | | |
|---|---|---|
| CN | 104837747 A | 8/2015 |
| CN | 105517923 A | 4/2016 |
| CN | 106081464 A | 11/2016 |
| CN | 106315100 A | 1/2017 |
| JP | 2000128307 A | 5/2000 |
| JP | 2012197184 A | 10/2012 |
| JP | 2015-189560 A | 11/2015 |
| JP | 2016506346 A | 3/2016 |
| JP | 2016-525490 A | 8/2016 |
| NO | 317366 B1 | 10/2004 |
| WO | 9849075 A1 | 11/1998 |
| WO | 2013167907 A1 | 11/2013 |
| WO | 2014-203126 A1 | 12/2014 |
| WO | 2015019055 A1 | 2/2015 |
| WO | 2015185628 A2 | 12/2015 |
| WO | 2015185726 A2 | 12/2015 |
| WO | 2016181734 A1 | 11/2016 |
| WO | 2017037095 A1 | 3/2017 |
| WO | 2017150006 A1 | 9/2017 |

OTHER PUBLICATIONS

First Office Action dated Jun. 30, 2020, by the Chinese Patent Office in corresponding Chinese Patent Application No. 201880008239.X, and an English Translation of the Office Action. (11 pages).
GB Search Report dated Jul. 16, 2018.
International Search Report (PCT/ISA/210) dated Apr. 30, 2018, by the European Patent Office as the International Searching Authority for International Application No. PCT/EP2018/052578.
Written Opinion (PCT/ISA/237) dated Apr. 30, 2018, by the European Patent Office as the International Searching Authority for International Application No. PCT/EP2018/052578.
Versona Systems: "Wireless Communication Failures disrupting the operation of a high-volume Automated Guided Vehicle (AGV) System", Jan. 3, 2016, 6 pages.
First Office Action dated Nov. 9, 2021, by the Japanese Patent Office in corresponding Japanese Patent Application No. 2020-570640, and an English Translation of the Office Action. (10 pages).
Office Action (Decision of Rejection) dated Nov. 30, 2021, by the Japanese Patent Office in corresponding Japanese Patent Application No. 2019-541776, and an English Translation of the Office Action. (6 pages).
First Office Action dated Feb. 16, 2021, by the Japanese Patent Office in corresponding Japanese Patent Application No. 2019-541776, and an English Translation of the Office Action. (10 pages).

(56) References Cited

OTHER PUBLICATIONS

First Office Action dated Jul. 4, 2022, by the Chinese Patent Office in corresponding Chinese Patent Application No. 202110532970.6, and an English Translation of the Office Action. (8 pages).
Office Action (Communication) dated Aug. 25, 2022, by the European Patent Office in corresponding European Patent Application No. 18 703 297.4. (6 pages).

* cited by examiner

SAFETY SYSTEM FOR AN AUTOMATED STORAGE AND PICKING SYSTEM AND METHOD OF OPERATION THEREOF

The present invention relates to a safety system for an automated storage and picking system. Particularly, but not exclusively, the invention relates to an electronic communications system communicating with robotic devices operative on the storage and picking system, the system comprising storage containers or bins comprising stacks of containers located within a framework, the robotic device operative on the top of the framework above the stacked containers.

Some commercial and industrial activities require systems that enable the storage and retrieval of a large number of different products. One known system for the storage and retrieval of items in multiple product lines involves arranging storage bins or containers on rows of shelves arranged in aisles. Each bin or container holds a plurality of products of one product type. The aisles provide access between the rows of shelves, so that the required products can be retrieved by operatives or robots that circulate in the aisles. It will be appreciated, however, that the need to provide aisle space to access the products means that the storage density of such systems is relatively low. In other words, the amount of space actually used for the storage of products is relatively small compared to the amount of space required for the storage system as a whole.

Online retail businesses selling multiple product lines, such as online grocers and supermarkets, require systems that are able to store tens or even hundreds of thousands of different product lines. The use of single-product stacks in such cases can be impractical, since a very large floor area would be required to accommodate all of the stacks required. Furthermore, it can be desirable only to store small quantities of some items, such as perishables or infrequently-ordered goods, making single-product stacks an inefficient solution.

Accordingly, for some applications, the use of multi-product stacks, in which the containers making up each stack may hold different products, is favoured in order to maximise the storage density of the system. The stored items must remain accessible reasonably quickly and easily, so that a plurality of different items required to fulfil a customer order can be picked from the storage system in an efficient way, even if some of the items required are stored in a lower level of a stack, underneath several other containers.

International patent application WO 98/049075A (Autostore), the contents of which are incorporated herein by reference, describes a system in which multi-product stacks of containers are arranged within a frame structure. A system of this type is illustrated schematically in FIGS. 1 to 4 of the accompanying drawings.

As shown in FIGS. 1 and 2, stackable containers, known as bins, totes or containers 10, are stacked on top of one another to form stacks 12. The stacks 12 are arranged in a grid frame structure 14 in a warehousing or manufacturing environment. FIG. 1 is a schematic perspective view of the frame structure 14, and FIG. 2 is a top-down view showing a stack 12 of bins 10 arranged within the frame structure 14. Each bin 10 typically holds a plurality of product items (not shown), and the product items within a bin 10 may be identical, or may be of different product types depending on the application.

The frame structure 14 comprises a plurality of upright members 16 that support horizontal members 18, 20. A first set of parallel horizontal members 18 is arranged perpendicularly to a second set of parallel horizontal members 20 to form a plurality of horizontal grid structures supported by the upright members 16. The members 16, 18, 20 are typically manufactured from metal. The bins 10 are stacked between the members 16, 18, 20 of the frame structure 14, so that the frame structure 14 guards against horizontal movement of the stacks 12 of bins 10, and guides vertical movement of the bins 10.

The top level of the frame structure 14 includes rails 22 arranged in a grid pattern across the top of the stacks 12. Referring additionally to FIGS. 3 and 4, the rails 22 support a plurality of robotic load handling devices 30. A first set 22a of parallel rails 22 guide movement of the load handling devices 30 in a first direction (X) across the top of the frame structure 14, and a second set 22b of parallel rails 22, arranged perpendicular to the first set 22a, guide movement of the load handling devices 30 in a second direction (Y), perpendicular to the first direction. In this way, the rails 22 allow movement of the load handling devices 30 laterally in two dimensions in the horizontal X-Y plane, so that a load handling device 30 can be moved into position above any of the stacks 12.

One form of load handling device 30 is described in PCT Patent Publication No WO2015/019055 (Ocado Innovation Ltd), the contents of which are incorporated herein by reference.

FIGS. 3(a) and 3(b) are schematic perspective views of such a load handling device 30 from the rear and front, respectively, and FIG. 3(c) is a schematic front perspective view of a load handling device 30 lifting a bin 10.

Each load handling device 30 comprises a vehicle 32 which is arranged to travel in the X and Y directions on the rails 22 of the frame structure 14, above the stacks 12. A first set of wheels 34, consisting of a pair of wheels 34 on the front of the vehicle 32 and a pair of wheels 34 on the back of the vehicle 32, is arranged to engage with two adjacent rails of the first set 22a of rails 22. Similarly, a second set of wheels 36, consisting of a pair of wheels 36 on each side of the vehicle 32, is arranged to engage with two adjacent rails of the second set 22b of rails 22. Each set of wheels 34, 36 can be lifted and lowered, so that either the first set of wheels 34 or the second set of wheels 36 is engaged with the respective set of rails 22a, 22b at any one time.

When the first set of wheels 34 is engaged with the first set of rails 22a and the second set of wheels 36 is lifted clear from the rails 22, the wheels 34 can be driven, by way of a drive mechanism (not shown) housed in the vehicle 32, to move the load handling device 30 in the X direction. To move the load handling device 30 in the Y direction, the first set of wheels 34 is lifted clear of the rails 22, and the second set of wheels 36 is lowered into engagement with the second set of rails 22a. The drive mechanism can then be used to drive the second set of wheels 36 to achieve movement in the Y direction.

The load handling device 30 is equipped with a lifting device 40. The lifting device 40 comprises a gripper plate 39 is suspended from the load handling device 30 by four cables 38. The cables 38 are connected to a winding mechanism (not shown) housed within the load handling device 30. The cables 38 can be spooled in or out from the load handling device 30, so that the position of the gripper plate 39 with respect to the vehicle 32 can be adjusted in the Z direction.

The gripper plate 39 is adapted to engage with the top of a bin 10. For example, the gripper plate 39 may include pins (not shown) that mate with corresponding holes (not shown) in the rim that forms the top surface of the bin 10, and sliding clips (not shown) that are engageable with the rim to grip the bin 10. The clips are driven to engage with the bin 10 by a suitable drive mechanism housed within the gripper plate 39, which is powered and controlled by signals carried through the cables 38 themselves or through a separate control cable (not shown).

To remove a bin 10 from the top of a stack 12, the load handling device 30 is moved as necessary in the X and Y directions so that the gripper plate 39 is positioned above the stack 12. The gripper plate 39 is then lowered vertically in the Z direction to engage with the bin 10 on the top of the stack 12, as shown in FIG. 3(c). The gripper plate 39 grips the bin 10, and is then pulled upwards on the cables 38, with the bin 10 attached. At the top of its vertical travel, the bin 10 is accommodated within the body of the vehicle 32 in a centrally positioned cavity and is held above the level of the rails 22. In this way, the load handling device 30 can be moved to a different position in the X-Y plane, carrying the bin 10 along with it, to transport the bin 10 to another location. The cables 38 are long enough to allow the load handling device 30 to retrieve and place bins from any level of a stack 12, including the floor level. The vehicle 32 is sufficiently heavy to counterbalance the weight of the bin 10 and to remain stable during the lifting process. The weight of the vehicle 32 may be comprised in part of batteries that are used to power the drive mechanism for the wheels 34, 36.

As shown in FIG. 4, a plurality of identical load handling devices 30 are provided, so that each load handling device 30 can operate simultaneously to increase the throughput of the system. The system illustrated in FIG. 4 includes two specific locations, known as ports 24, at which bins 10 can be transferred into or out of the system. An additional conveyor system (not shown) is associated with each port 24, so that bins 10 transported to a port 24 by a load handling device 30 can be transferred to another location by the conveyor system, for example to a picking station (not shown). Similarly, bins 10 can be moved by the conveyor system to a port 24 from an external location, for example to a bin-filling station (not shown), and transported to a stack 12 by the load handling devices 30 to replenish the stock in the system.

Each load handling device 30 can lift and move one bin 10 at a time. If it is necessary to retrieve a bin 10 ("target bin") that is not located on the top of a stack 12, then the overlying bins 10 ("non-target bins") must first be moved to allow access to the target bin 10.

Each of the load handling devices 30 is under the control of a central computer. Each individual bin 10 in the system is tracked, so that the appropriate bins 10 can be retrieved, transported and replaced as necessary.

A further form of load handling device 30 is described in Norwegian patent number 317366, the contents of which are incorporated herein by reference. In the described load handling device the vehicle comprises a cantilever arm carrying the gripper plate. Said load handling device operates in a manner as described above but occupies two grid space positions on the grid as a result of the cantilever arm.

The system described with reference to FIGS. 1 to 4 has many advantages and is suitable for a wide range of storage and retrieval operations. In particular, it allows very dense storage of product, and it provides a very economical way of storing a huge range of different items in the bins 10, while allowing reasonably economical access to all of the bins 10 when required for picking.

For high-volume systems in which speed of operation is critical, it is important to maximise the performance of each of the load handing devices, in terms of speed of operation, battery life, reliability, lifting capacity, stability and so on. It may therefore be desirable to provide load-handling devices that offer improved performance in one or more of these areas.

It may also be desirable to increase the number of load handling devices in use at any one time, to allow an increase in the speed with which items can be retrieved from the storage system. For example, the Applicant's co-pending International Patent Application No. PCT/GB2013/051215, the content of which is incorporated herein by reference, describes a storage system in which a plurality of each of two different types of load handling device are provided. One type of load handling device is adapted to lift a plurality of bins from a stack in one operation, to allow a target bin in the stack to be accessed by a single-bin load handling device of the second type. In such cases, it may be desirable to reduce the size of the load handling devices in order to minimise instances in which the optimum movement path for one device is hindered by the presence of other devices.

It will be appreciated that in storage and retrieval systems as described above, there will be times when it is necessary to access the load handling devices on the grid. For example, should a device become inoperative or stranded, it may be necessary for operatives to access the grid to repair or remove such stranded devices. In this case it is essential that the remaining load handling devices be temporarily incapacitated such that injury to the operative does not occur.

Furthermore, such storage and retrieval systems are provided with access points on to the top level of the system via doors, openings and access points on to the grid. It is essential that it is not possible for an operative to access the grid space whilst the load handling devices are operating.

In large storage systems it is possible that hundreds or thousands of robotic load handling devices are operating on the grid. These devices can be moving at 4 m/sec and could cause severe injury should an operative be able to access the grid space whilst the devices are running.

It is against this background that the present invention has been devised.

According to the invention there is provided a safety system for an automated storage and picking system, the storage and picking system comprising a first set 22a of parallel rails 22 or tracks and a second set 22b of parallel rails 22 or tracks extending transverse to the first set in a substantially horizontal plane to form a grid pattern comprising a plurality of grid spaces; a plurality of storage containers 10 arranged in stacks, located beneath the rails 22 and at least one load handling device 30 disposed on the grid, arranged to move on rolling means laterally above the stacks 12 on the rails 22; the storage system further comprising a transmitter 100 transmitting a signal 110, the transmitter 100 further comprising activation means 120, the or each load handling device 30 comprising a receiver portion, the receiver portion being adapted to receive the signal 110 from the transmitter 100, the receiver portion further comprising switch means for interrupting power to the rolling means of the load handling device 30, the activation means 120 being adapted so as to stop transmission of the signal 110 from the transmitter 100 on activation by external means, said activation causing the switch means to cut power to the rolling means of the or each load handling device 30 thereby stopping each load handling device 30.

According to the invention there is further provided a method of safely stopping a plurality of load handling devices 30 operating on a storage and picking system, the storage and picking system comprising a first set 22a of parallel rails 22 or tracks and a second set 22b of parallel rails 22 or tracks extending transverse to the first set in a substantially horizontal plane to form a grid pattern comprising a plurality of grid spaces; a plurality of storage containers 10 arranged in stacks, located beneath the rails 22 and at least one load handling device 30 disposed on the grid, arranged to move on rolling means laterally above the stacks 12 on the rails 22, the storage system further comprising a transmitter 100 transmitting a signal 110, the transmitter 100 further comprising activation means 120, the or each load handling device 30 comprising a receiver portion, the receiver portion being adapted to receive the signal 110 from the transmitter 100, the receiver portion further comprising switch means for interrupting power to the rolling means of the load handling device 30, the activation means 120 being adapted so as to stop transmission of the signal 110 from the transmitter 100 on activation by external means, the method comprising the steps of transmitting a signal from the transmitter 100, receiving the signal 110 at the or each receiver, activating the activation means 120 by external means, said activation interrupting the signal 110, the interruption in the signal causing the power to the rolling means of the load handling devices 30 to be cut, thereby stopping the load handling devices on the storage system.

In this way, a safety system for an automated storage and picking system is described. The storage system includes load handling devices operating above a series of stacked containers, the stacked containers 10 being located within a framework, the top of which comprises tracks on which the load handling devices 30 operate. The safety system includes a transmitter located in close proximity to the storage system and a receiver located on each of the load handling devices. The transmitter continually transmits a signal that is detected by the receivers on the load handling devices 30. In the event of an emergency or a breach of the storage system, the transmission of the signal is cut.

Once the receiver no longer receives the signal from the transmitter, power to the drive means of the load handling device 30 is cut and the storage system is rendered safe.

Preferred and/or optional features of each aspect of the invention may be used, alone or in appropriate combination in the other aspects of the invention also.

Figure 1:
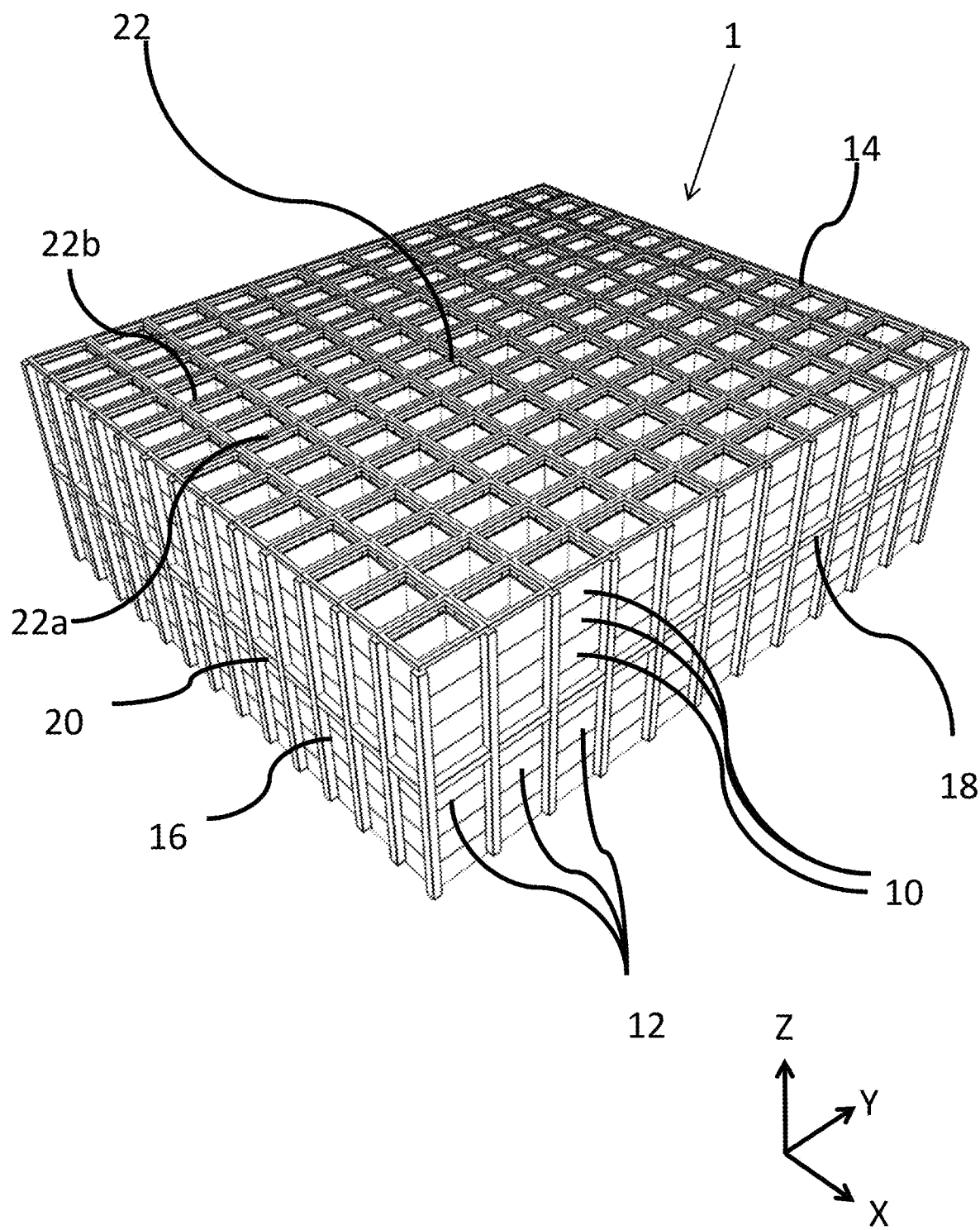
FIG. 1 is a schematic perspective view of a frame structure for housing a plurality of stacks of bins in a known storage system.
Figure 2:
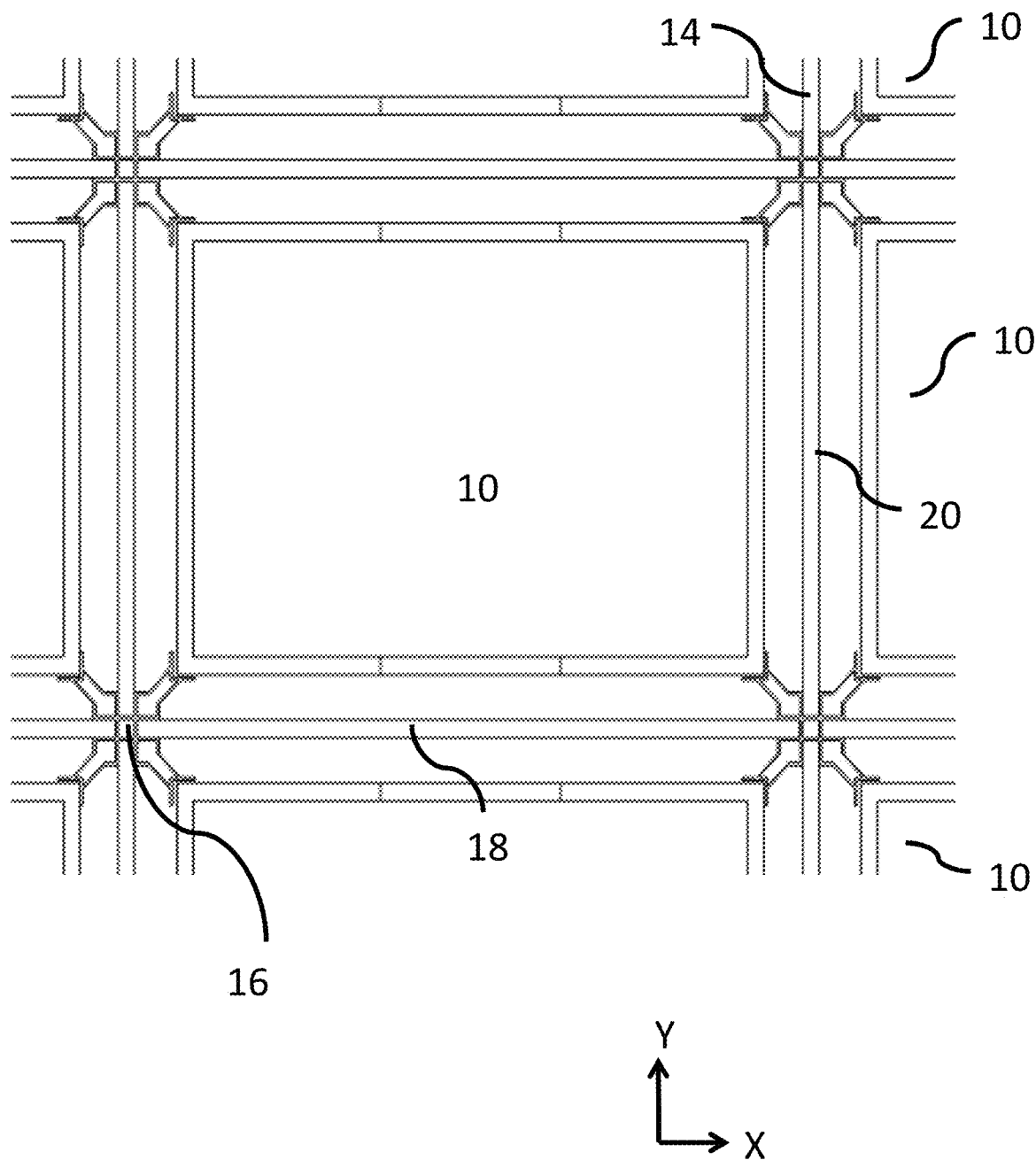
FIG. 2 is a schematic plan view of part of the frame structure of FIG. 1.
Figure 3A:
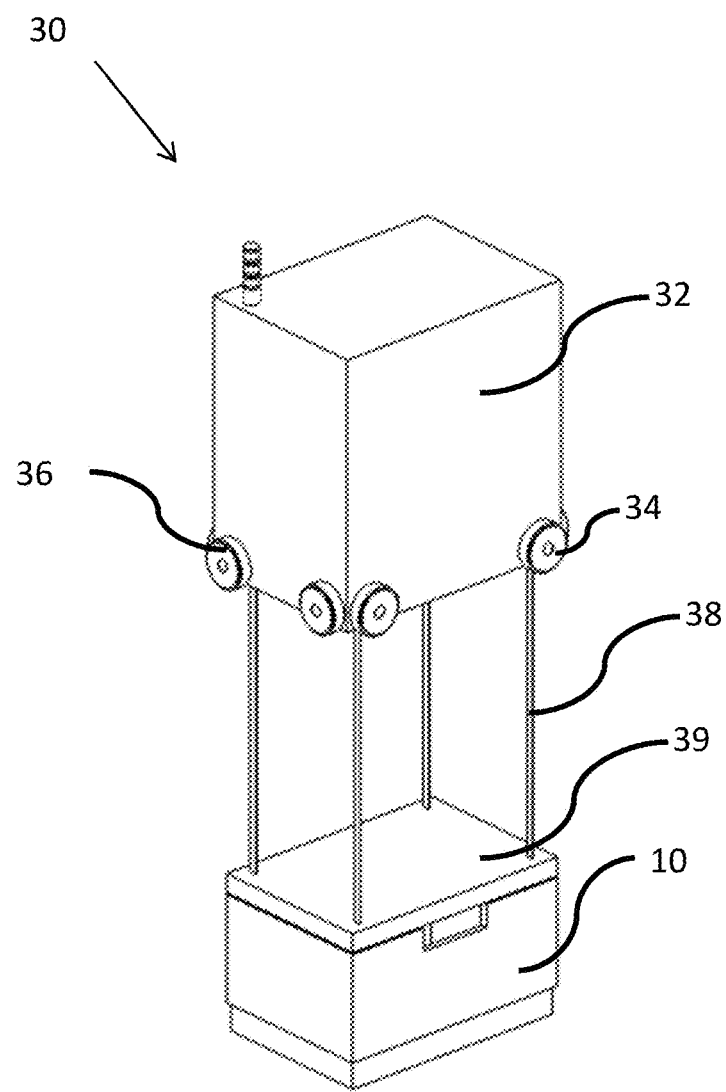
Figures 3B, 3C:
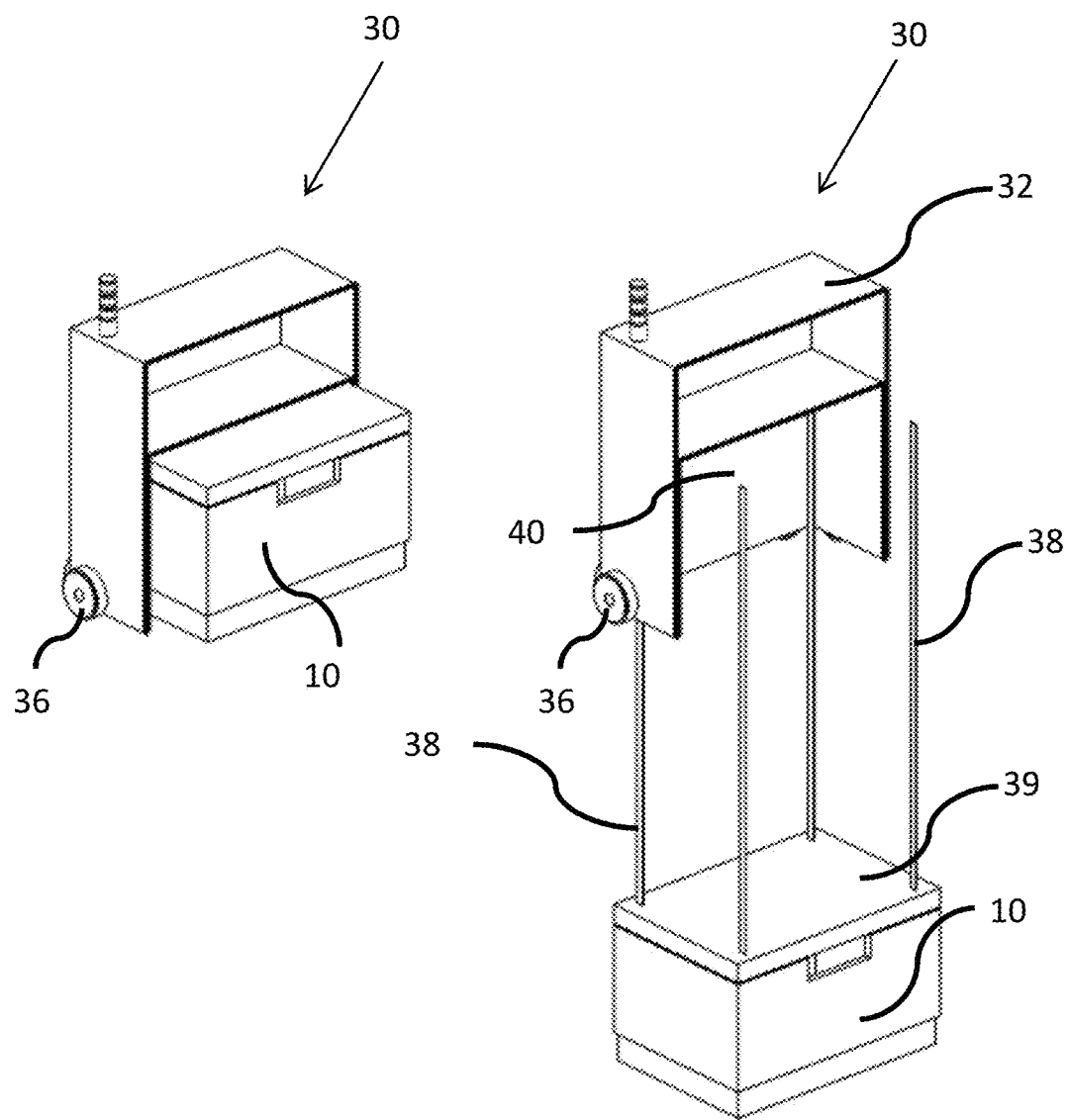
Figure 4:
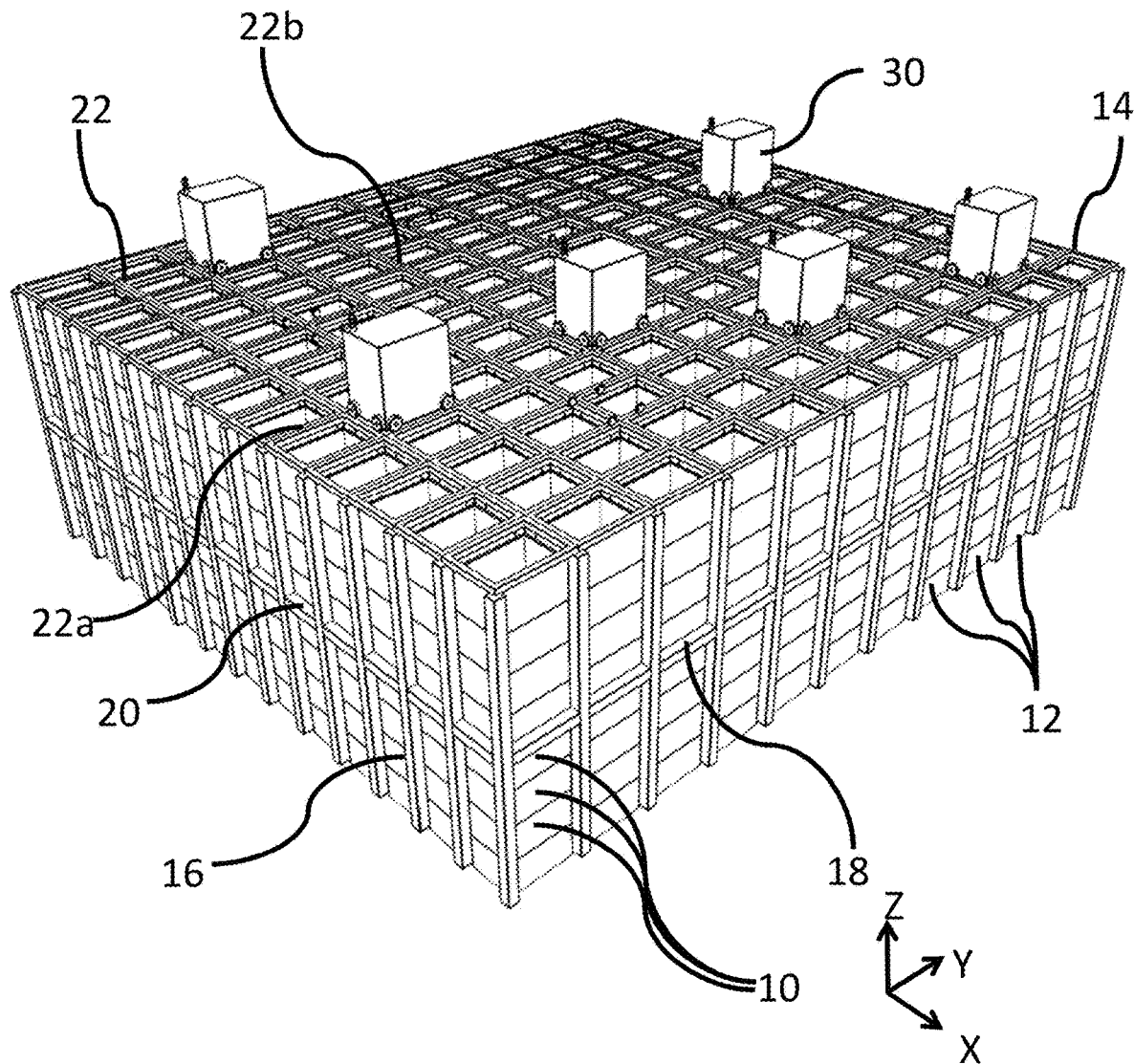

FIGS. 3(a) and 3(b) are schematic perspective views, from the rear and front respectively, of a known load handling device for use with the frame structure of FIGS. 1 and 2, and FIG. 3(c) is a schematic perspective view of the known load handling device in use lifting a bin; and FIG. 4 is a schematic perspective view of a known storage system comprising a plurality of load handling devices of the type shown in FIGS. 3(a), 3(b) and 3(c), installed on the frame structure of FIGS. 1 and 2.

Figure 5:
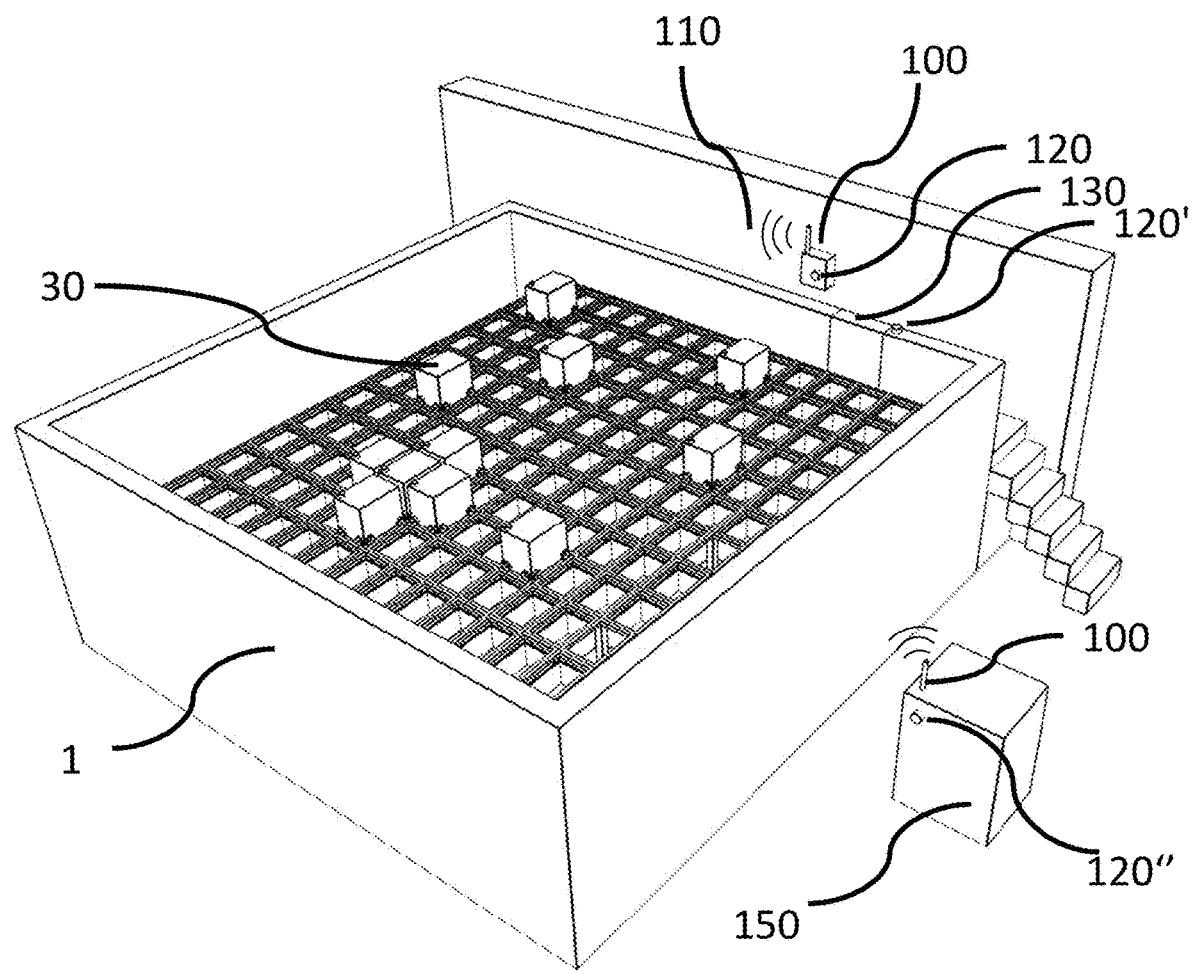

Embodiments of the present invention will now be described, by way of example only, with reference to the remainder of the accompanying drawings, in which like reference numerals are used for like features, and in which:

FIG. 5 is a schematic perspective view of a security system in accordance with one aspect of the invention.

There are many areas of a large scale storage and picking system that may be of concern in terms of possible access points on to the grid. For example, maintenance areas comprising a grid access door 130, an "outduct" airlock, where load handling devices 30 are removed from the grid, a service workshop and the induct airlock, where load handling devices 30 are input on to the grid. The size of airlocks and the service workshop may vary between installations.

The grid access door 130 is used for accessing the grid on the occasion a faulty load handling device 30 is unable to return automatically to the outduct airlock, or for any other maintenance issues requiring operatives to access the load handling devices 30 or any other aspects of the system.

Load handling devices 30 requiring maintenance or repair are removed from the grid via the outduct airlock following a specific procedure. The outduct airlock consists of three (3) interlock doors which can only be opened in sequence while the grid and hence the storage system 1 is still active and/or enabled.enabled.

Load handling devices 30 return to the grid via an induct airlock. This may be a bigger area than the outduct airlock (for example a 3×3 square) as load handling devices 30 complete their self-directed set-up test. It also comprises, for example three interlocked doors which can to be opened in sequence.

The service workshop is the area where load handling devices 30 are repaired by operatives or engineers. In this area load handling devices 30 are always isolated unless supported off their wheels on a test stand or on a hoist thus ensuring personnel and equipment safety.

To ensure high level of system and personnel safety all load handling devices 30 may be equipped with a local Estop Button. Once the Estop button is pressed, the X and Y motors of the load handling devices 30 become electrically disabled and the devices 30 will stop. Load handling devices may have the Estop mounted on their top for easy and fast access by operators. However, it is not always possible for these estops to be accessed if the load handling devices 30 are in operation on the grid.

The safety system comprises three distinct portions. The first portion comprises a safety circuit adapted so as to be mounted on each of the load handling devices 30. The safety circuit (not shown) on each load handling device 30 comprises a receiver and a timed relay. This safety circuit is installed in or on the load handling device 30 such that when the safety circuit is activated remotely the power to the load handling device 30 is removed. This causes the load handling device 30 to stop.

The second portion comprises a separate transmitter 100 mounted adjacent the storage and picking system 1 in a position accessible to operatives and users. The transmitter 100 transmits a signal 110 receivable by the receiver on the load handling device 30. The second portion further comprises switch or button means 120, 120', 120" that activate the safety system when pushed or operated. There may be more than one button 120, 120', 120" or switch means each having a different function as described below. Furthermore, there may be a plurality of transmitters 100 mounted at various locations around the storage and picking system.

The third portion comprises a Programmable Logic Controller (PLC) 150 that may be hardwired to the transmitter 100 of the second portion.

It will be appreciated that the storage system may comprise further access points, doors and locking devices that may be hardwired to the PLC 150 but for simplicity the system will be described with only the parts shown in the Figures. If additional stops, buttons 120, 120', 120" or transmitters 100 be provided, the operation of such devices will be similar to that described for the limited number of parts herein. It should be noted however, that other personnel and grid access doors with monitoring and locking devices are hardwired to the PLC 150.

It will be appreciated that the primary function of the safety system is to ensure that no operator can ever come in to contact with a live load handling device 30.

When installed on a storage and picking system 1 such as that described with reference to FIGS. 1 to 4, the safety system ensures that no access doors on to the grid can be opened until all of the load handling devices 30 have been safety stopped (i.e. stopped with power removed). Furthermore, if an access point or door was somehow opened (i.e. overridden/forced) the load handling device 30 would be automatically safety stopped. Additionally, when an operator (not shown) is active on the grid the activation of the safety system ensures that the load handling devices 30 cannot be restarted (either by accident or through a mechanical/electrical/software fault).

For the safe and more efficient operation of the storage and picking system, various safety and non-safety rated wireless signals may be exchanged between the load handling devices 30 and the safety system of the invention.

In use, the second portion of the safety system comprising the transmitter 100, emits a signal 110 that is received by all the load handling devices 30 on the storage and picking system 1. The relay in the safety circuit in the or each load handling device 30 is closed when the receiver within the safety circuit receives the signal 110 emitted by the transmitter 100. Preferably, the transmitter 100 emits a pulse or a "heartbeat-type" signal that the safety circuit on each load handling device 30 receives. For as long as the safety circuits receive this transmission, the load handling devices 30 will continue to operate.

Should any of the buttons 120, 120', 120" or for example the button 120 on the transmitter be pressed, the transmission of the signal 110 is stopped. This break in the signal 110 causes the relay in the safety circuit to switch to an open position and hence the power to the load handling device 30 is cut.

In one form of the invention, to be described by example only, there are two situations in which the load handling devices 30 can be stopped, although it will be appreciated that there may be other situations in which a stop can occur.

In the situation where a scheduled access to the grid is required or a load handling device 30 is stranded and must be manually removed from the grid, a "grid access request" is used. In this situation, the button 120 is pressed on the transmitter or, for example, on the outside of the door to the grid. The activation of this button 120 sends a request to the computer utility or system controlling the operation of the load handling devices 30 on the grid. This action 'controlled stops' the grid. In such a situation, the load handling devices 30 complete their current tasks and then stop. Once this controlled stop has taken place the transmitter 100 will stop transmitting and the load handling devices 30 will be "safety stopped" as the signal will no longer be received by the receivers on board the load handling devices 30. It will be appreciated that this can take a period of time, for example, approximately 30 seconds.

In an emergency situation, for example an unauthorised grid access or a load handling device 30 colliding with a portion of the grid surround or crash barrier, it may not be possible to stop the load handling devices in such a controlled manner and it may be necessary to stop the system immediately. In the case of such an emergency stop, a master emergency stop button 120 may be pressed sending a signal 110 directly to the load handling devices 30 via the transmitter 100. This acts so as to instruct the load handling devices 30 to stop on the next possible grid square of the system. This will take as little as 3 seconds and after this command is sent the load handling devices 30 will safety stop.

It will be appreciated that both these situations require the commands to be passed through the PLC 150.

It will be appreciated that on removing the load handling devices 30 from the storage and picking system, it is a requirement that the said devices 30 pass through an 'airlock' style door system such that they can be electrically isolated (i.e. power removed) before they come into contact with an operator.

It will be appreciated that the transmissions may be of any frequency it is only a requirement that the transmitters and receivers operate at the same frequency.

It will further be appreciated that buttons 120 may be mounted for specific operation at points such as the maintenance area, the induct and the outduct. However, it is also possible for interlock type buttons to be used such that the system estops if a door or access point is opened.

It will be apparent to a person skilled in the art of electronics how the above-mentioned circuits and systems may be implemented in practice within the devices and mechanical systems described above. The invention is not limited to a specific circuit design or implementation and any suitable implementation or variation of the safety circuit capable of acting so as cut the drive power to the load handling devices 30 when active on the storage system may be envisaged or anticipated.

Other variations and modifications not explicitly described above will also be apparent to the skilled reader.

The invention claimed is:

1. A safety system for an automated storage and picking system, the storage and picking system having a first set of parallel rails or tracks, and a second set of parallel rails or tracks extending transverse to the first set in a substantially horizontal plane to form a grid pattern having a plurality of grid spaces; a plurality of storage containers arranged in stacks, located beneath the rails, the safety system comprising:

at least one load handling device operable to move on rolling means laterally above stacks on rails;
a transmitter for transmitting a signal, the transmitter having activation means configured upon activation to stop transmission of the signal from the transmitter;
each load handling device having a receiver portion, the receiver portion having a circuit configured to receive the signal from the transmitter such that the load handling device will continue to move on rolling means laterally above the stacks on the grid on receipt of the signal, the safety circuit having switch means to cut power to the rolling means of the load handling device when transmission of the signal by the transmitter is stopped such that the signal is not received by the receiver portion.

2. The safety system of claim 1, in which activation of the activation means causes the transmitter to stop transmitting the signal to the load handling device in a controlled or emergency operation, in which the period of time to stop transmission in the controlled operation is longer than in the emergency operation.

3. A safety system according to claim 1, wherein the activation means comprises external means having interlock means located on any openable access point on or adjacent the storage system.

4. A safety system according to claim 3, in which the interlock means is configured to automatically activate on opening of the access point.

5. A safety system according to claim 1, in which at least one load handling device comprises:
lifting means configured for lifting containers from stacks within a storage system.

6. A safety system according to claim 1, in combination with a storage system comprising:
controlling means for controlling operation of each load handling device on the storage system, said safety system comprising:
communication means for communicating with the controlling means, such that when the controlling means is activated, the communication means transmits a request to a remote computing system to stop operation of each load handling device on the storage system.

7. A safety system according to claim 6, in which on activation of the activation means, the switch means is configured to cut power to each load handling device and each load handling device will stop on the storage system thereby allowing access on to the grid in a safe manner.

8. A safety system according to claim 6, in which each load handling device is sized to occupy at least one grid space in the storage system.

9. A safety system according to claim 6, in which the storage and picking system comprises:
an interface to an online retail system.

10. A safety system according to claim 9, comprising:
containers containing items to be stored, customer orders or empty bags awaiting filling.

11. A safety system according to claim 6, wherein the activation means comprises external means having button or switch means located adjacent the storage system, said button or switch means being configured for operation by a user of the system in an event of an emergency.

12. A safety system according to claim 11, wherein, when the signal is not received by the receiver portion, the switch means is configured to cut power to each load handling device and each load handling device will stop on the storage system thereby allowing access on to the grid in a safe manner.

13. A safety system according to claim 12, in which the storage and picking system comprises:
an interface to an online retail system.

14. A safety system according to claim 13, in which each load handling device is sized to occupy at least one grid space in the storage system.

15. A safety system according to claim 14, in which at least one load handling device comprises:
lifting means configured for lifting containers from stacks within a storage system.

16. A method of safely stopping a plurality of load handling devices operating on a storage and picking system, the storage and picking system having a first set of parallel rails or tracks and a second set of parallel rails or tracks extending transverse to the first set in a substantially horizontal plane to form a grid pattern having a plurality of grid spaces; a plurality of storage containers arranged in stacks, located beneath the rails and at least one load handling device disposed on the grid and operable to move on rolling means laterally above the stacks on the rails, the method comprising:
transmitting a signal via a transmitter of the storage system, the transmitter having activation means configured upon activation to stop transmission of the signal from the transmitter;
receiving at a load handling device receiver portion, the signal from the transmitter such that the load handling device will continue to move on rolling means laterally above the stacks on the grid on receipt of the signal, the receiver portion having switch means for cutting power to the rolling means of the load handling device when transmission of the signal by the transmitter is stopped such that the signal is not received by the receiver portion; and
activating the activation means by external means of the transmitter, said activation interrupting transmission the signal from the transmitter, the interruption in the signal causing the switch means of the receiver portion to cut power to the rolling means of each load handling device, thereby stopping each load handling device on the storage system.

* * * * *